(12) United States Patent
Wiebe et al.

(10) Patent No.: US 7,681,714 B2
(45) Date of Patent: Mar. 23, 2010

(54) APPARATUS FOR DISPENSING GRAVEL

(76) Inventors: Jake Wiebe, c/o 71059 Floodway Drive, S., St. Clements, Manitoba (CA) R1A 2A8; George Wiebe, c/o 71059 Floodway Drive, S., St. Clements, Manitoba (CA) R1A 2A8

( * ) Notice: Subject to any disclaimer, the term of this patent is extended or adjusted under 35 U.S.C. 154(b) by 137 days.

(21) Appl. No.: 12/115,113

(22) Filed: May 5, 2008

(65) Prior Publication Data

US 2009/0272626 A1    Nov. 5, 2009

(51) Int. Cl.
*B65G 47/04*    (2006.01)
(52) U.S. Cl. .................... 198/540; 198/860.5; 198/812; 198/950
(58) Field of Classification Search ............ 198/540, 198/544, 562, 711, 812, 836.1, 837, 860.3, 198/860.5; 193/5; 52/195, 196, 197
See application file for complete search history.

(56) References Cited

U.S. PATENT DOCUMENTS

| | | | | |
|---|---|---|---|---|
| 773,596 | A * | 11/1904 | Roenius ................... | 193/34 |
| 1,455,511 | A * | 5/1923 | Triggs ..................... | 52/204.55 |
| 2,422,268 | A * | 6/1947 | Symonds .................. | 414/353 |
| 3,797,625 | A * | 3/1974 | Price ....................... | 193/34 |
| 4,096,793 | A * | 6/1978 | Wachter et al. ........... | 99/467 |
| 4,099,607 | A * | 7/1978 | Brennan et al. ........ | 198/341.01 |
| 4,180,157 | A * | 12/1979 | Bessette ................... | 198/747 |
| 4,375,855 | A * | 3/1983 | Floyd ...................... | 209/705 |
| 4,917,562 | A * | 4/1990 | Colli et al. ............... | 414/420 |
| 5,477,957 | A * | 12/1995 | Bold ........................ | 198/622 |
| 6,390,280 | B1* | 5/2002 | Boyce ...................... | 198/540 |
| 7,017,727 | B2* | 3/2006 | Cavallaro, Jr. ........... | 193/33 |
| 7,228,955 | B2* | 6/2007 | Comas Corral .......... | 198/527 |

* cited by examiner

*Primary Examiner*—Douglas A Hess
(74) *Attorney, Agent, or Firm*—Adrian D. Battison; Ade & Company Inc.

(57) ABSTRACT

Gravel is fed into and spread onto the floor of a newly constructed basement by a hanging frame which attaches to a window sill and supports a hydraulically driven conveyor belt with a feed spout at a feed end of the conveyor belt and a guidance belt mounted on top of the conveyor belt. The hanging frame converges to a front post which pivotally supports a frame of the conveyor belt for movement side to side about an upright axis through the feed spout and carries an adjustable brace which raises and lowers the conveyor. A feed chute is located outside the window. The conveyor includes a guide conveyor on top and is driven by a power source and pump located outside the building.

10 Claims, 3 Drawing Sheets

Top View

Side View

APPARATUS FOR DISPENSING GRAVEL

This invention relates to an apparatus for dispensing gravel or other particulate material in a basement of a building under construction for forming a basement floor.

SUMMARY OF THE INVENTION

According to one aspect of the invention there is provided an apparatus for dispensing particulate material in a basement comprising:

a continuous conveyor belt wrapped around two spaced rollers so as to define an upper run of the belt for conveying the material;

a feed spout at a feed end of the conveyor belt for guiding the particulate material onto the conveyor belt;

a guidance belt mounted on top of the conveyor belt and wrapped around two spaced rollers so as to define a lower run of the guidance belt for guiding the material as it travels along the conveyor belt;

a support frame supporting the rollers of the conveyor belt and providing a support for the upper run, the fame carrying the guidance belt on top of the conveyor belt;

and a mounting frame for carrying the support frame;

the mounting frame comprising:

a pair of hanging arms shaped and arranged to engage over the sill of a basement window at spaced positions across the window such that the arms hang down from the sill inside the basement to a position spaced from the ground;

a mounting portion extending forwardly from the hanging arms across the ground and converging to a forward end;

a pivot mount on the mounting portion arranged for pivotal movement about a generally upright axis;

the pivot mount having portions thereon for attachment to the support frame at the feed end of the conveyor to carry the support frame and to provide pivotal movement of the support frame about the upright axis at the feed end;

the pivot mount being attached to the feed end of the support frame to provide pivotal movement of the support frame about a generally horizontal axis transverse to the conveyor at the feed end so as to allow upward and downward movement of the discharge end of the conveyor;

and a brace attached to the mounting portion for pivotal movement about the upright axis and extending upwardly and outwardly along the support frame so as to engage and support the support frame at a position thereon spaced outwardly of the pivot mount;

the brace being adjustable in length to adjust the height of the discharge end of the conveyor.

Preferably the mounting portion is generally triangular converging from the pair of hanging arms to a front post.

Preferably the mounting portion includes two triangular frame pieces with one above the other and each including a cross rail connecting the hanging arms and two converging rails extending forwardly and inwardly from the cross rail to an apex at the front post.

Preferably the pivot mount is carried on an upper pivot of the post and comprises a horizontal arm and a pair of upstanding supports.

Preferably each upstanding support includes one of a pair of trunnions each receiving a pin of the frame.

Preferably support frame four parallel bars forming top and bottom frames with cross bars to support upper run and upstanding bars.

Preferably the upright pivot axis is arranged so that it passes through the feed spout.

Preferably the conveyor is driven by a hydraulic drive motor carried on the frame.

Preferably there is provided a hydraulic drive pump mounted on a separate portable frame for mounting with a power source outside the window.

Preferably there is provided a feed chute to feed the particulate material through window into the feed spout.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
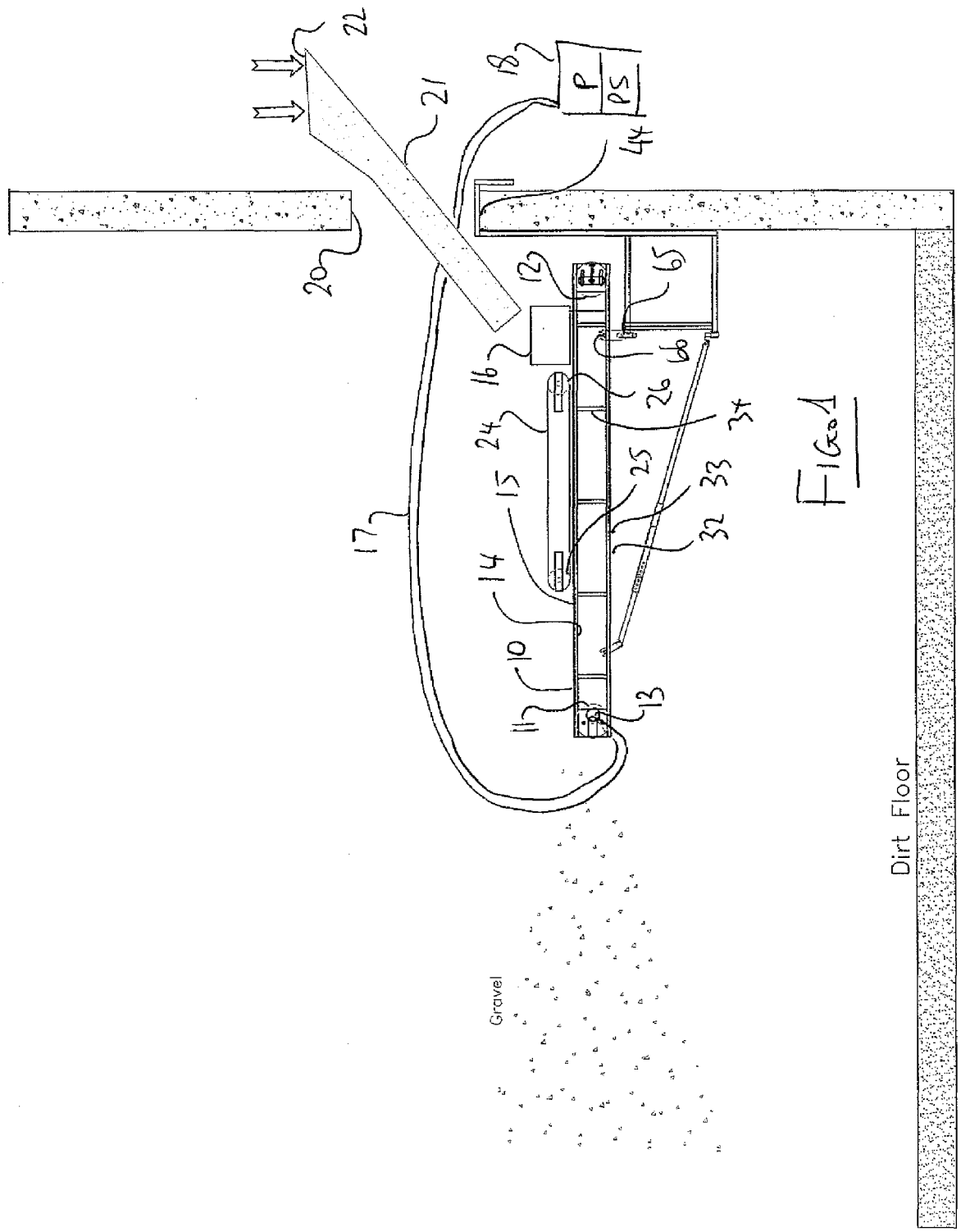
FIG. 1 is a side elevational view of an apparatus according to the present invention.
Figure 2:
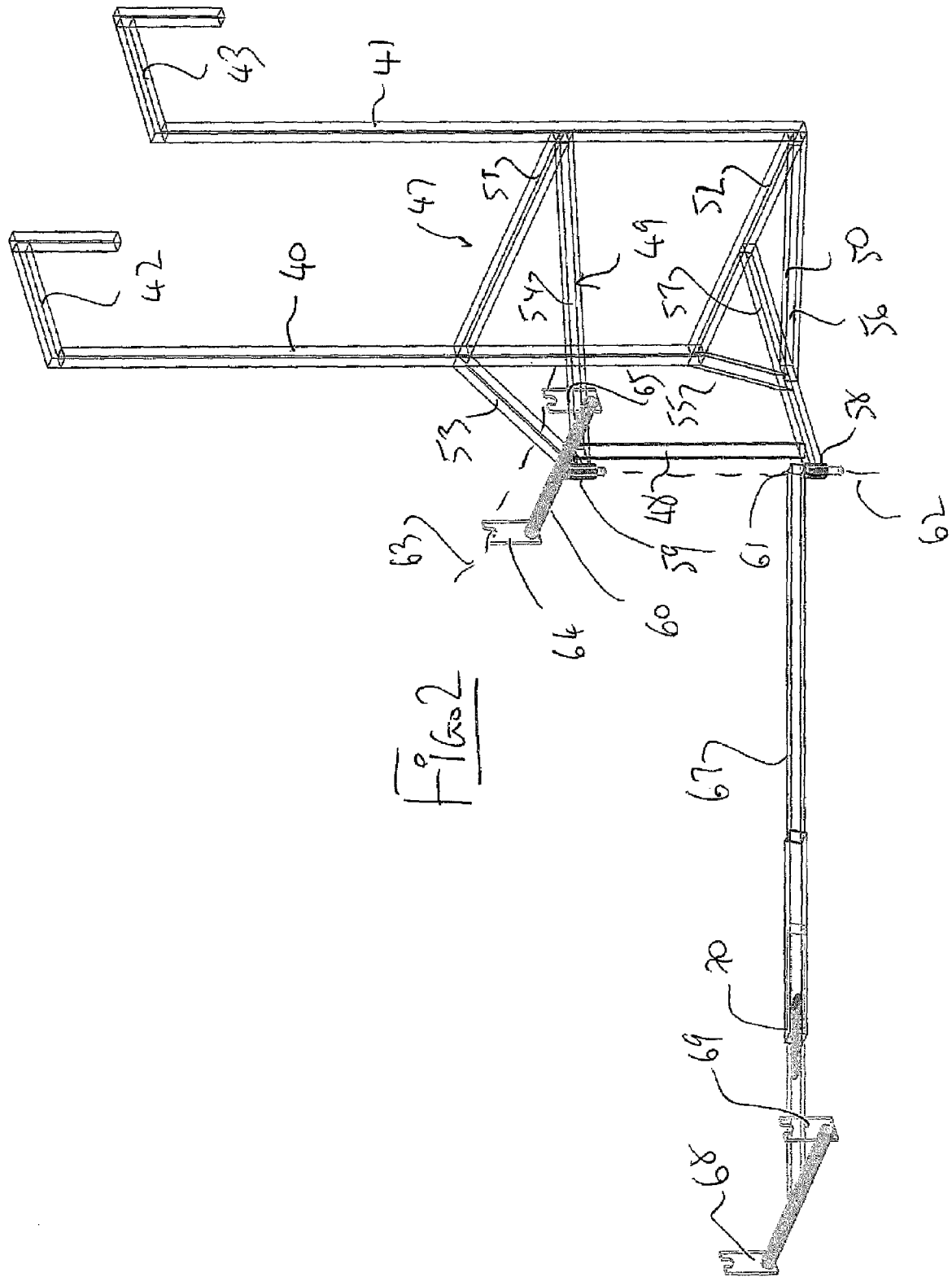
FIG. 2 is an isometric view of a mounting frame for the conveyor of FIG. 1.
Figure 4:
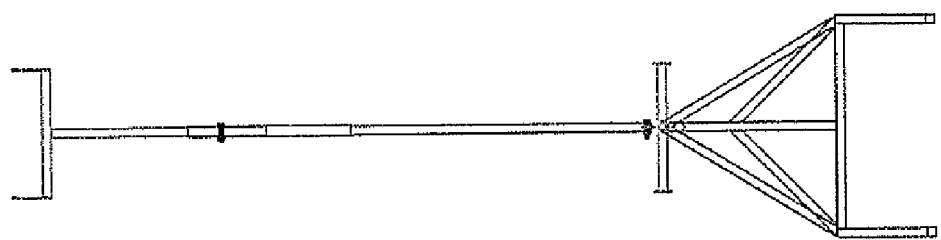
FIG. 4 is a top plan view of the mounting frame of FIG. 2.
Figure 3:
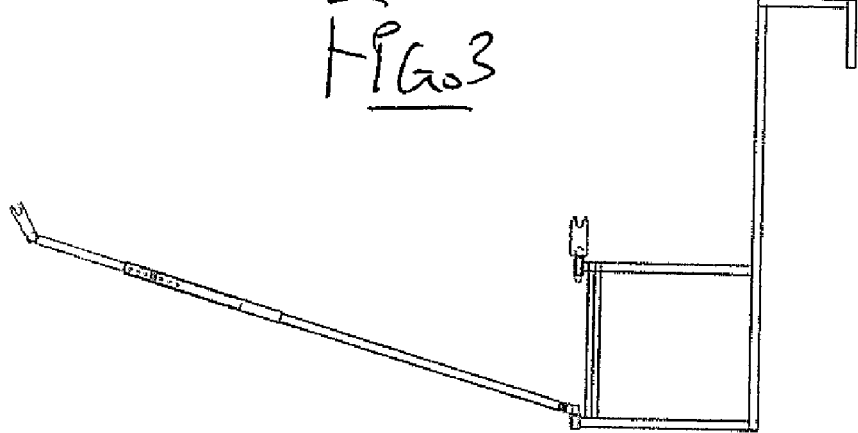
FIG. 3 is a side elevational view of the mounting frame of FIG. 2.

The apparatus for gravel and/or concrete in a basement includes a continuous conveyor belt 10 wrapped around two spaced rollers 11 and 12 carried at opposite ends of a frame 14 so as to define an upper run 15 of the belt for conveying the material.

One of the rollers 11 and 12 is driven by a hydraulic motor 13 from a power source and pump assembly 18 through supply lines 17. The separate unit 18 is arranged to be transportable and located outside a window opening 20 of the basement to be supplied.

A feed spout 16 is located at a feed end of the conveyor belt 10 for guiding the particulate material onto the conveyor belt. The feed spout is arranged to be filled with the material from a chute 21 extending through the opening 20 with an upper mouth 22 for receiving the material from a discharge chute of a delivery truck or the like.

A guidance belt 24 is mounted on top of the conveyor belt and is wrapped around two spaced rollers 25, 26 so as to define a lower run of the guidance belt for guiding the material as it travels along the conveyor belt. The length of the guidance belt is shorter than the main belt so that it starts after the spout 16 and ends before the end of the main belt. Thus it acts to guide and accelerate the material on the main belt so that it formed into a thin stream fed forwardly and ejected from the end of the main belt to be thrown thereby to required locations in the basement area. The distance of throw is controlled by the speed of the belt and the height of the discharge end of the belt.

A support frame supports the rollers of the conveyor belt and provides a support for the upper run and carries the guidance belt on top of the conveyor belt. The support frame comprises two parallel bars 30 and 31 forming a top frame together with two bottom bars 32 and 33 forming a bottom frame with cross bars 35 to support the upper run and upstanding bars 36 connecting the top and bottom frames. The rollers 11 and 12 are located within the frame so formed. The guidance conveyor 24 is located on top of the bars 30 and 31 and is carried thereby.

The support frame is carried by mounting frame defined by a pair of hanging arms 40 and 41 with upper hook portions 42 and 43 shaped and arranged to engage over the sill 44 of the basement window opening 20 at spaced positions across the window such that the arms hang down from the sill inside the basement to a position spaced from the ground 46. A mounting portion 47 extends forwardly from the hanging arms across the ground and converges to a post 48 forward end.

The mounting portion 47 is generally triangular converging from the pair of hanging arms to the front post 48 and includes two triangular frame pieces 49 and 50 with one above the other and each including a cross rail 51, 52 connecting the hanging arms and two converging rails 53, 54 and 55, 56 extending forwardly and inwardly from the cross rail to an apex at the front post. A rail 57 of the bottom frame 50 extends from the rail 52 through the apex to the post 48.

A pivot mount is defined n the post 48 for pivotal movement about a generally upright axis and includes a bottom pivot 58 and a top pivot 59 positioned just in front of the post.

The pivot mount has couplings 60 and 61 thereon for attachment to the support frame at the feed end of the conveyor to carry the support frame and to provide pivotal movement of the support frame about the upright axis 62 at the feed end. The pivot mount is attached to the feed end of the support frame to provide pivotal movement of the support frame about a generally horizontal axis 63 transverse to the conveyor at the feed end so as to allow upward and downward movement of the discharge end of the conveyor. The pivot mount is carried on an upper pivot of the post and comprises a horizontal arm and a pair of upstanding supports where each upstanding support defines one of a pair of trunnions each receiving a pin 66 of the frame.

A brace 67 is attached to the coupling 61 of the mounting portion for pivotal movement about the upright axis 62 and extending upwardly and outwardly along the support frame so as to engage and support the support frame by another support defining trunnions 68 and 69 at a position thereon spaced outwardly of the pivot mount. The brace is adjustable in length at adjustment 70 to adjust the height of the discharge end of the conveyor.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for dispensing particulate material in a basement comprising:
    a continuous conveyor belt wrapped around two spaced rollers so as to define an upper run of the belt for conveying the material;
    a feed spout at a feed end of the conveyor belt for guiding the particulate material onto the conveyor belt;
    a guidance belt mounted on top of the conveyor belt and wrapped around two spaced rollers so as to define a lower run of the guidance belt for guiding the material as it travels along the conveyor belt;
    a support frame supporting the rollers of the conveyor belt and providing a support for the upper run, the frame carrying the guidance belt on top of the conveyor belt;
    and a mounting frame for carrying the support frame;
    the mounting frame comprising:
    a pair of hanging arms shaped and arranged to engage over the sill of a basement window at spaced positions across the window such that the arms hang down from the sill inside the basement to a position spaced from the ground;
    a mounting portion extending forwardly from the hanging arms across the ground and converging to a forward end;
    a pivot mount on the mounting portion arranged for pivotal movement about a generally upright axis;
    the pivot mount having portions thereon for attachment to the support frame at the feed end of the conveyor to carry the support frame and to provide pivotal movement of the support frame about the upright axis at the feed end;
    the pivot mount being attached to the feed end of the support frame to provide pivotal movement of the support frame about a generally horizontal axis transverse to the conveyor at the feed end so as to allow upward and downward movement of the discharge end of the conveyor;
    and a brace attached to the mounting portion for pivotal movement about the upright axis and extending upwardly and outwardly along the support frame so as to engage and support the support frame at a position thereon spaced outwardly of the pivot mount;
    the brace being adjustable in length to adjust the height of the discharge end of the conveyor.

2. The apparatus according to claim 1 wherein the mounting portion is generally triangular converging from the pair of hanging arms to a front post.

3. The apparatus according to claim 2 wherein the mounting portion includes two triangular frame pieces with one above the other and each including a cross rail connecting the hanging arms and two converging rails extending forwardly and inwardly from the cross rail to an apex at the front post.

4. The apparatus according to claim 1 wherein the pivot mount is carried on an upper pivot of the post and comprises a horizontal arm and a pair of upstanding supports.

5. The apparatus according to claim 4 wherein each upstanding support includes one of a pair of trunnions each receiving a pin of the frame.

6. The apparatus according to claim 1 wherein the support frame comprises four parallel bars forming top and bottom frames with cross bars to support the upper run and upstanding bars connecting the top and bottom frames.

7. The apparatus according to any one of claims 1 wherein the upright pivot axis is arranged so that it passes through the feed spout.

8. The apparatus according to claim 1 wherein the conveyor is driven by a hydraulic drive motor carried on the frame.

9. The apparatus according to claim 8 wherein there is provided a hydraulic drive pump mounted on a separate portable frame for mounting with a power source outside the window.

10. The apparatus according to claim 1 wherein there is provided a feed chute to feed the particulate material through a window into the feed spout.

* * * * *